US012688378B2

(12) United States Patent
Varga

(10) Patent No.: US 12,688,378 B2
(45) Date of Patent: Jul. 21, 2026

(54) ID TAG TECHNOLOGY

(71) Applicant: RVmagnetics, a.s., Košice (SK)

(72) Inventor: Rastislav Varga, Hodkovce (SK)

(73) Assignee: RVMAGNETICS, A.S., Košice (SK)

( * ) Notice: Subject to any disclaimer, the term of this patent is extended or adjusted under 35 U.S.C. 154(b) by 0 days.

(21) Appl. No.: 19/043,840

(22) Filed: Feb. 3, 2025

(65) Prior Publication Data

US 2025/0252276 A1     Aug. 7, 2025

Related U.S. Application Data

(60) Provisional application No. 63/550,210, filed on Feb. 6, 2024.

(51) Int. Cl.
G06K 7/08          (2006.01)
(52) U.S. Cl.
CPC .................................... G06K 7/083 (2013.01)
(58) Field of Classification Search
CPC ...................................................... G06K 7/083
See application file for complete search history.

(56) References Cited

U.S. PATENT DOCUMENTS

| | | |
|---|---|---|
| 4,484,090 A | 11/1984 | Wiegand et al. |
| 6,084,400 A | 7/2000 | Steinich et al. |
| 7,852,215 B2 | 12/2010 | Marin Palacios et al. |

| | | | | |
|---|---|---|---|---|
| 2003/0085809 A1* | 5/2003 | Antonenco | ........ | G08B 13/2408 |
| | | | | 340/572.6 |
| 2013/0106805 A1* | 5/2013 | Forster | .................. | G06F 3/1431 |
| | | | | 345/204 |
| 2015/0085419 A1* | 3/2015 | Oikawa | .................. | H03K 17/82 |
| | | | | 361/159 |

FOREIGN PATENT DOCUMENTS

| | | | | |
|---|---|---|---|---|
| AU | 2014200336 A1 | 8/2014 | | |
| CA | 2317659 A1 * | 7/1999 | ............. | G06K 7/083 |
| DE | 2817169 A1 | 4/1978 | | |
| DE | 3302084 A1 | 7/1984 | | |
| DE | 3427582 A1 | 2/1986 | | |
| DE | 4107847 C1 | 9/1992 | | |

(Continued)

OTHER PUBLICATIONS

Sergio Puerta et al., Propagation of domain walls in bistable amorphous wires and microwires, Journal of Non-Crystalline Solids 287 (2001), pp. 370-373.

(Continued)

*Primary Examiner* — Tuyen K Vo
(74) *Attorney, Agent, or Firm* — Hovey Williams LLP; Paul J. Walker

(57)          ABSTRACT

A method for identifying an identification (ID) tag that includes at least one magnetically bistable element. The method comprises one or more steps, including transmitting, via an excitation antenna, an excitation signal to the magnetically bistable element. An additional step includes receiving, via a pick-up antenna, a response signal generated by the bistable element. An additional step includes analyzing the response signal to identify at least two peaks in the response signal. A further step includes generating an identification code based on the two peaks, with the identification code being representative of an identity of the bistable element.

18 Claims, 3 Drawing Sheets

(56)  References Cited

FOREIGN PATENT DOCUMENTS

| | | | | |
|---|---|---|---|---|
| DE | 19807000 | A1 | 8/1999 | |
| DE | 102009010983 | A1 | 9/2010 | |
| EP | 0484716 | A1 | 5/1992 | |
| EP | 1715466 | A2 * | 10/2006 | ......... G08B 13/2411 |
| EP | 3407026 | A1 | 11/2018 | |
| EP | 3444743 | A1 * | 2/2019 | ....... G06K 19/06187 |
| ES | 2124171 | A1 | 1/1999 | |
| GB | 2071336 | A | 9/1981 | |
| GB | 2073428 | A | 10/1981 | |
| GB | 2349051 | A * | 10/2000 | ......... G06K 7/10336 |
| GB | 2374084 | A | 10/2002 | |
| JP | H03252577 | A | 11/1991 | |
| KR | 101956710 | B1 | 11/2018 | |
| KR | 102297428 | B1 | 9/2021 | |
| SU | 1753425 | A1 | 8/1992 | |
| WO | WO-2008020148 | A2 * | 2/2008 | ......... G08B 13/2448 |
| WO | 2023194852 | A1 | 10/2023 | |
| WO | WO-2024157160 | A1 * | 8/2024 | ........... F16D 66/028 |

OTHER PUBLICATIONS

Gerd Rauscher et al., Wiegand and Pulse-Wire Sensors, XP-000775813, Goip3/481w, 199, pp. 315-339.
Chao Yang, et al., Improvement of Pulse Voltage Generated by Wiegand Sensor Through Magnetic-Flux Guidance, Department of Electrical and Computer Engineering, Yokohama National University, Japan, Jan. 2020, Sensors 2020, 20, 1408, 10 pages.

* cited by examiner

ID TAG TECHNOLOGY

RELATED APPLICATIONS

This application claims the priority benefit under 35 U.S.C. § 119 (e) of U.S. Provisional Patent Application Ser. No. 63/550,210 entitled "ID Tag Technology," filed Feb. 6, 2024, the entire disclosure of which is incorporated herein by reference.

BACKGROUND

1. Field of the Invention

The present disclosure is generally related to identification tags based on a bistable amorphous microwire combined with an excitation and sensing system.

2. Description of the Related Art

Spanish Patent Application Publication No. ES2124171A1 describes an encoding strip with bistable amorphous microwires that, due to their magnetic properties, contain information about an object. The time T1 at which a bistable flip is recorded for each microwire is evaluated and this time in one half-wave characterizes the corresponding microwire. A different group of microwires will generate a different set of times (T1), which allows ID tags to be generated with different responses. The disadvantage of the solution according to ES2124171A1 is that the time T1 changes not only depending on the characteristics of the microwire, but also changes due to external factors, such as the position of the reader, interference fields, etc. The technology is based on bistable amorphous microwire technology using an excitation signal, which consists of the rising half-period and falling half-period. A signal from the microwire is sensed in the whole period. The period is divided between the intervals, which are set as zero (0) by default, which means that a peak (signal) from microwire is not present in the interval. If the signal from the microwire is detected in the interval, the interval will be marked as one (1). Depending on the number of peaks from the microwire, a unique code from 0 and 1 is created. The disadvantage of this principle is the presence of outer magnetic fields, which can change the position of the signal from the microwire. As one is looking at the position of the peaks, shifting of the signal with the presence of the outer magnetic field completely devaluates the identification tag.

Korean Patent No. KR101956710B1 discloses identification technology, wherein amorphous microwire is used, but there is no mention about the bistability of the microwire and it is used mainly for paper identification. The paper is divided into the mesh, with the microwires distributed in the mesh. With the reading device, the magnetic response (magnetic permeability) of the microwires is read. There are more groups with the same composition, and every composition (group) has a specific magnetic response, which is assigned to the mesh. Due to that, it is possible to distinguish between the papers with various groups of microwires. Papers are distinguished also based on the plurality of microwires from the same group (composition) and their layout in the mesh. The production of microwires differs from the Taylor-Ulitovsky method, and there is also no mention about a glass coating. The properties concerning bistability are not disclosed or discussed, as they are measuring the permeability of the microwire. With the presence of an external parasitic field, the signal is destroyed.

Korean Patent No. KR102297428 discloses technology wherein a substrate and magnetic wire are needed. The wire is not made from one composition but is formed from multiple wires connected together in many ways possible. The wire is composed from an amorphous part with some permeability value, and a second crystallic part, which influences the amorphous part. The crystallic part can also be omitted. The changing of the crystallic part influences the amorphous part and creates a unique response in the magnetic field produced by reading device. This can be used to distinguish the ID codes or plagiarism. The wires can be arranged on the substrate in a random way, or create a mesh, which represents the possibility for various ID tags. However, crystallic wires are not bistable and reliable in producing signals. With the presence of an external parasitic field, the signal is destroyed.

U.S. Pat. No. 7,852,215 discloses another identification technology based on glass-coated microwire. This ID tag can be activated or deactivated, based on the outer magnetic field. This ID tag is composed of two parts. The first part is a soft magnetic bistable microwire, and the second part is a hard magnetic microwire, which is created by the annealing of the soft magnetic microwire beyond the crystallization point. The hard magnetic microwire has to be divided in parts of same length. Those parts must be equally distant from each other along the soft magnetic microwire. Active state for this ID tag represents the demagnetized crystallic parts (hard magnetic microwires have their remanent magnetism). In the active state, the outer field is higher than the switching (critical) field to remagnetize the soft magnetic bistable microwire, but not the hard magnetic microwires. More than one microwire is needed for this ID tag. With the presence of external parasitic field, the demagnetizing signal is destroyed.

Disadvantages of the prior art disclosures are that they can operate substantially only under laboratory conditions, where randomly interfering magnetic fields do not occur. In actual practice, and particularly in industrial environments, various magnetic fields are present and result in the generation of noise up to and including failure of identification according to the above three prior art disclosures.

SUMMARY

Embodiments of the present invention include a method for identifying an identification (ID) tag that includes at least one magnetically bistable element. The method comprises one or more steps, including transmitting, via an excitation antenna, an excitation signal to the magnetically bistable element. An additional step includes receiving, via a pick-up antenna, a response signal generated by the bistable element. An additional step includes analyzing the response signal to identify at least two peaks in the response signal. A further step includes generating an identification code based on the two peaks, with the identification code being representative of an identity of the bistable element.

In certain embodiments, the analyzing step or the generating step includes determining a first time T1 at which a first peak of the at least two peaks in the response signal occurs and a second time T2 at which a second peak of the at least two peaks in the response signal occurs. And the identification code is a sum of the first time T1 and the second time T2.

In certain embodiments, the analyzing step and the generating step are performed by a computing device comprising a processing element and a memory element. The memory element provides a database, and the computing device is configured to compare the generated identification code to a plurality of identification codes stored in the database to identify the bistable element of the ID tag.

In some embodiments, the excitation antenna and the pick-up antenna each comprises an inductor coil.

In some embodiments, the excitation signal comprises a triangular wave.

In some embodiments, the identification code is a first code, and each of the steps of the method is repeated after adjusting an excitation parameter of the excitation signal to generate a second identification code.

In some embodiments, the excitation parameter is selected from one or more of the following: a frequency of the excitation signal, a waveform of the excitation signal, and an amplitude of the excitation signal.

In some embodiments, the bistable element comprises a bistable microwire including a metal core and a glass coating around the metal core.

In some embodiments, the bistable microwire has a length of at least 6 mm.

In some embodiments, the bistable microwire has a diameter from 10 to 100 μm.

In some embodiments, the transmitting and receiving steps are performed with the excitation antenna and the pick-up antenna being positioned within 10 cm of the bistable element.

Embodiments of the present invention further include an identification system comprising an excitation antenna configured to transmit an excitation signal to at least one magnetically bistable element. The identification system additionally includes a pick-up antenna configured to receive a response signal generated by the bistable element. The identification system further includes a computing device comprising a processing element and a memory element. The processing element is configured to perform one or more steps including analyzing the response signal to identify at least two peaks in the response signal. An additional step includes generating an identification code based on the two peaks. The identification code is representative of an identity of the bistable element.

In some embodiments, during the analyzing and/or generating steps, the processing element is configured to determine a first time T1 at which a first peak of the at least two peaks in the response signal occurs and a second time T2 at which a second peak of the at least two peaks in the response signal occurs, and wherein the identification code is a sum of the first time T1 and the second time T2.

In some embodiments, the memory element of the computing device provides a database, and the processing element is further configured to compare the generated identification code to a plurality of identification codes stored in the database to identify the bistable element.

In some embodiments, the excitation antenna and the pick-up antenna each comprises an inductor coil.

In some embodiments, the excitation signal transmitted by the excitation antenna is a triangular wave.

In some embodiments, the identification code is a first code, and the processing element of the computing device is configured to repeat the analyzing and generating steps upon an excitation parameter of the excitation signal being adjusted, to thereby generate a second identification code.

In some embodiments, the excitation parameter is selected from one or more of the following: a frequency of the excitation signal, a waveform of the excitation signal, and an amplitude of the excitation signal.

In some embodiments, the bistable element comprises a bistable microwire comprising a metal core with a glass coating, the bistable microwire has a length of at least 6 mm, and the bistable microwire has a diameter from 10 to 100 μm.

In some embodiments, the excitation antenna and the pick-up antenna are configured to transmit to and receive from, respectively, the bistable element when the excitation antenna and the pick-up antenna are positioned within 10 cm of the bistable element.

BRIEF DESCRIPTION OF THE FIGURES

Embodiments of the present invention are described herein with reference to the following drawing figures, wherein.

DETAILED DESCRIPTION

Figure 1:
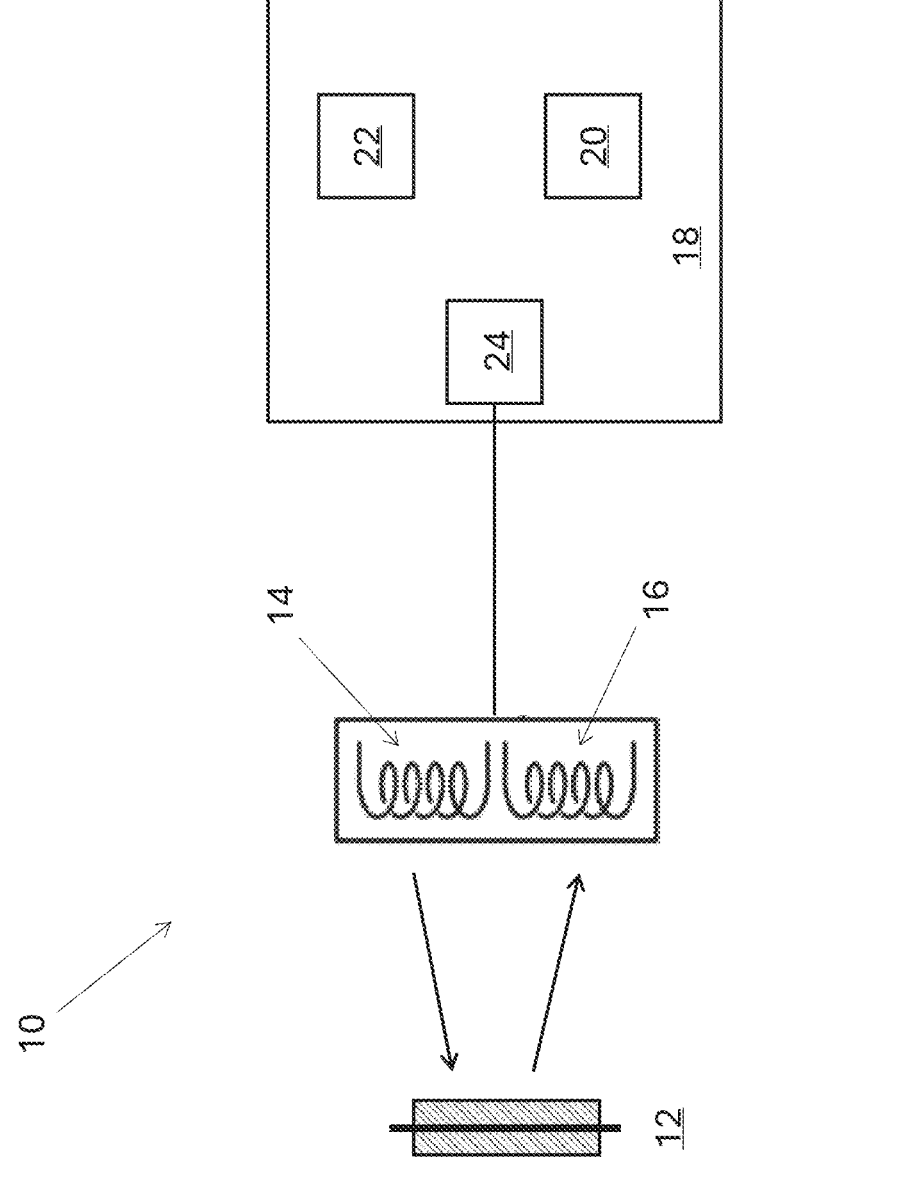
FIG. 1 is a schematic depiction of an identification tag system according to embodiments of the present invention.

Embodiments of the present invention are directed to an identification ("ID") tag system 10, as illustrated in FIG. 1, which may comprise a bistable amorphous microwire 12 and an excitation and sensing system. The excitation and sensing system may comprise at least one excitation unit 14 and at least one pick-up unit 16. The excitation unit 14 may comprise an antenna and/or coil (e.g., an inductive coil) configured to create a magnetic field that comprises an excitation signal that can be received by the microwire 12. In certain embodiments, the excitation signal is in the form of a triangular wave. In response to the excitation signal, the microwire 12 is configured to produce a magnetic field that comprises a response signal that can be received by the pick-up unit 16, with the pick-up unit 16 also being in the form of an antenna and/or coil (e.g., an inductive coil).

Figure 2:
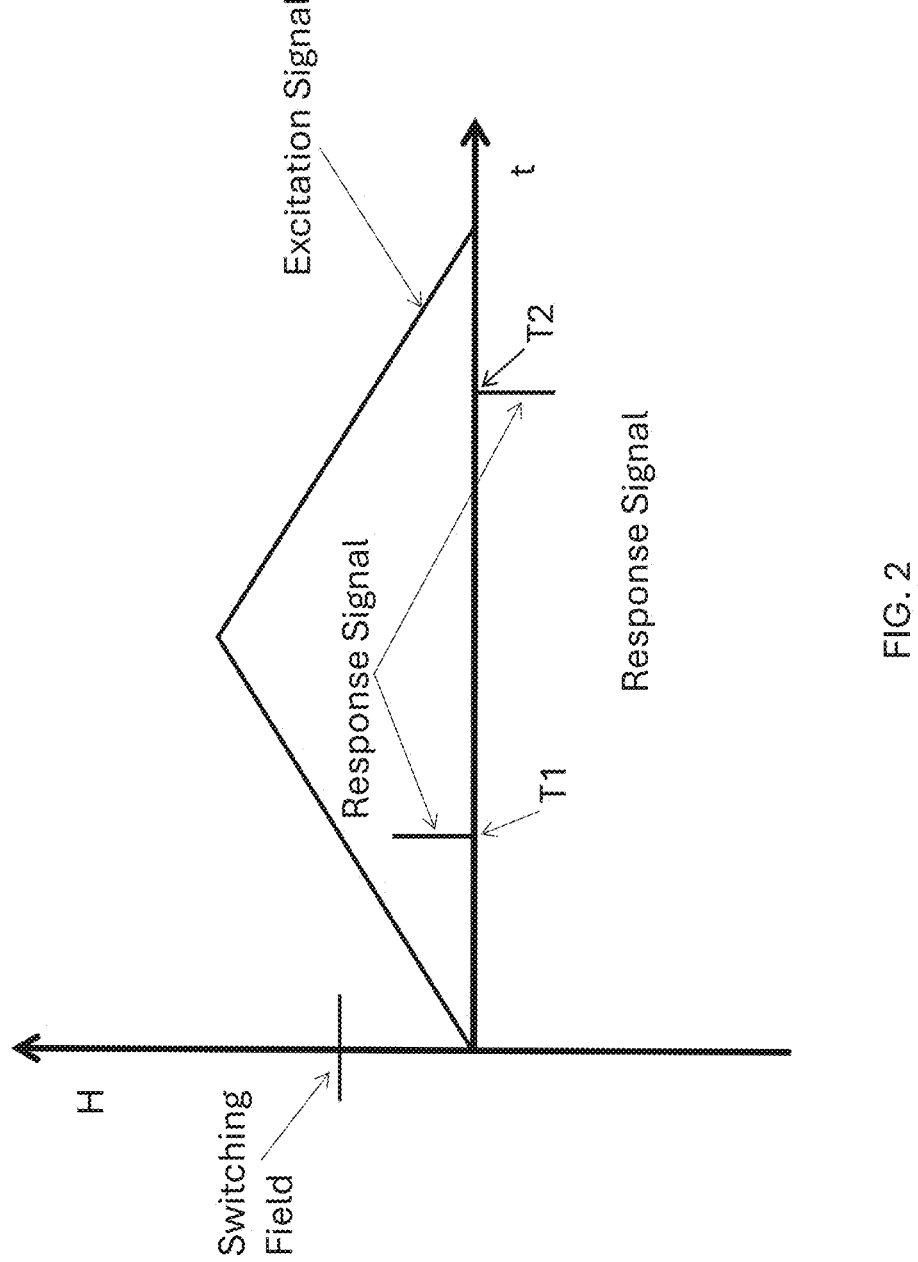
FIG. 2 is an exemplary plot of an excitation signal generated by an excitation unit from the identification tag system of FIG. 1 and a corresponding response signal generated by a bistable microwire from the identification tag system of FIG. 1.

In various embodiments, the microwire in the produced magnetic field (i.e., in the excitation signal) creates a specific signal (i.e., the response signal), which can be distinguished from the other magnetic materials, in the form of two peaks. These two peaks include one peak (maximum) on the first half-period of the triangular excitation signal, and one peak (minimum) on the second half-period. Such peaks occur when the excitation signal reaches the switching field value of the microwire, which is the magnetic field strength necessary to change the microwire between its two states, namely, a positive saturation state or a negative saturation state. For instance, as illustrated in FIG. 2, the maximum peak of the response signal of the microwire occurs at time T1 when the excitation signal reaches the switching field strength. Similarly, the minimum peak of the response signal of the microwire occurs at time T2 when the excitation signal again reaches the switching field strength.

In certain embodiments, the bistable microwire will comprise a metallic core with a glass-coating or sheath surrounding the core. The domain structure of a bistable microwire comprises a single, axially magnetized domain, which is magnetized in the single large Barkhaussen jump of the closure domains that appears naturally to decrease the stray fields. As a result, microwires show magnetic bistability, i.e., their magnetization state is characterized by only two states, namely, positive or negative saturation. The switching between these two states appears at the switching field that corresponds to the depinning field of the closure domain. Generally, the character of the response signal of the microwire will depend on the: (1) composition of the microwire, (2) diameter of the metallic core of the microwire, (3) diameter of the glass-coating of the microwire, (4) length of the microwire, and/or (5) frequency of the excitation signal. With knowledge of all these physical quantities, the inventors of the present application have discovered microwires can be mass produced with characteristic response signals in the form of two peaks.

The shortcomings of the prior art are significantly eliminated by a method of identification using an ID tag comprising at least one magnetically bistable element, preferably a magnetically bistable microwire, wherein times at which a change in the magnetic state of the magnetically bistable element according to the present invention occurs is measured, the nature of which is that the time Ta1 of the change in the magnetic state of the magnetically bistable element in the first excitation half-wave is measured, and the time Ta2 of the change of the corresponding magnetically bistable element in the second excitation half-wave is measured, and then the sum Ta=Ta1+Ta2 is calculated. The sum Ta is used to evaluate the presence of the corresponding magnetically bistable element "a." The first excitation half-wave and the second excitation half-wave have an oppositely oriented vector, for example, the excitation field in the first half-wave increases to a positive value of the maximum above the x-axis and the excitation field in the second half-wave subsequently increases to a negative value of the maximum below the x-axis. The time value Ta1 and Ta2 correspond to the time interval that is calculated from the beginning of the corresponding half-wave of the excitation signal, i.e., that from the zero value of the excitation field the time starts to be calculated anew for each half-wave, when the purpose of the time measurement is actually to find out the position of the bistable state flip from the beginning of the excitation increase.

For the ID tag, the sum of the time position of the two peaks is significant. The sum represents the identification tag because with the change of at least one microwire characteristic (e.g., composition, diameters, etc.), completely new sum of the two peaks will be formed, as the peaks will shift on the time scale of the period of excitation.

The addition of the two measured times Ta1+Ta2 has been found to be significant because the sum of these times is a very stable and robust parameter that is not subject to external interferences. For example, if changing the distance between the ID tag and the excitation and sensing system in the real environment shortens the time Ta1, the time Ta2 is lengthened, while the sum is substantially constant. As a result, it is the sum of the measured times Ta1+Ta2 that can be used to clearly identify the presence of a magnetically bistable element "a." This makes the method of identification useful not only in laboratory conditions, but also in industrial or other practice. Specifically, the sum of the peaks (i.e., T1+T2), will remain generally constant, even in the presence of an outer magnetic field.

This method and system can be used with just one magnetically bistable element, but may also be used with preferably a grouping of multiple magnetically bistable elements "a, b, c . . . " in a single ID tag, wherein these individual magnetically bistable elements "a, b, c . . . " will differ in at least one physical and/or chemical-physical parameter that affects the measured response of the bistable state transition. Such a parameter may be, for example, chemical composition or length, and the like. For example, for three magnetically bistable elements "a, b, c," the times Ta1, Tb1, Tc1, Ta2, Tb2, Tc2 are recognized, and the sums Ta=Ta1+Ta2, Tb=Tb1+Tb2, and Tc=Tc1+Tc2 are calculated. Consequently, in this example, the values of Ta, Tb, and Tc substantially represent the identification code of the ID tag.

By using multiple magnetically bistable elements, preferably in the form of microwires, multiple possible combinations of responses may be created (e.g., response signals and sums of peak times Tx=Tx1+Tx2 (x=1, 2, 3 . . . n), which may be important to achieve a sufficient number of mutually distinguishable identification codes. In doing so, it may be important to take into account sufficient distance of the identification codes with regard to possible signal noise and evaluation inaccuracies. The number of mutually distinguishable identification codes will increase dramatically if one group of magnetically bistable elements (or even just one magnetically bistable element) is excited and scanned in at least two steps or stages at different excitation parameters. The excitation parameter may be excitation frequency, excitation waveform, and/or excitation amplitude. A combination is also possible where one excitation parameter is changed first, and then a stage with a different excitation parameter is changed. Changes in excitation parameters may result in a different response, while the different characteristics of the individual magnetically bistable elements will also be apparent if multiple elements are used in the ID tag. In principle, these differences are non-linear and difficult to predict without measuring the actual response.

The identification according to the present invention may comprise the step of sensing the responses of the ID tags and storing the measured identification codes in a database with an association to an individual ID tag. The table of identification codes in the database can be used to assign authorizations when identifying ID tags, since without this database it may not be possible to effectively recognize ID tags among themselves. As a result, sets of ID tags can be created for different applications with separate identification code databases. Unlike RFID tags, where codes are made up of an alphanumeric character (usually 96 bits) that can be uniquely rewritten as a text character and thus can be read by essentially any reader at the appropriate frequency, for an identification according to the present invention it is necessary to have information about the individual scanning stages with changing parameters so that comparison with the database results in a successful assignment. Such a procedure brings the advantage of assigning different levels of access and indirect encryption.

As the response signal from the microwire is dependent on the frequency of the excitation signal, with the change of excitation frequency, the microwire will change its characteristics (e.g., response signal and sum of peak times T=T1+T2) and a new identification tag code may be created. The scale of excitation frequencies may be from 50 to 20,000 Hz (audio frequencies).

Figure 3:
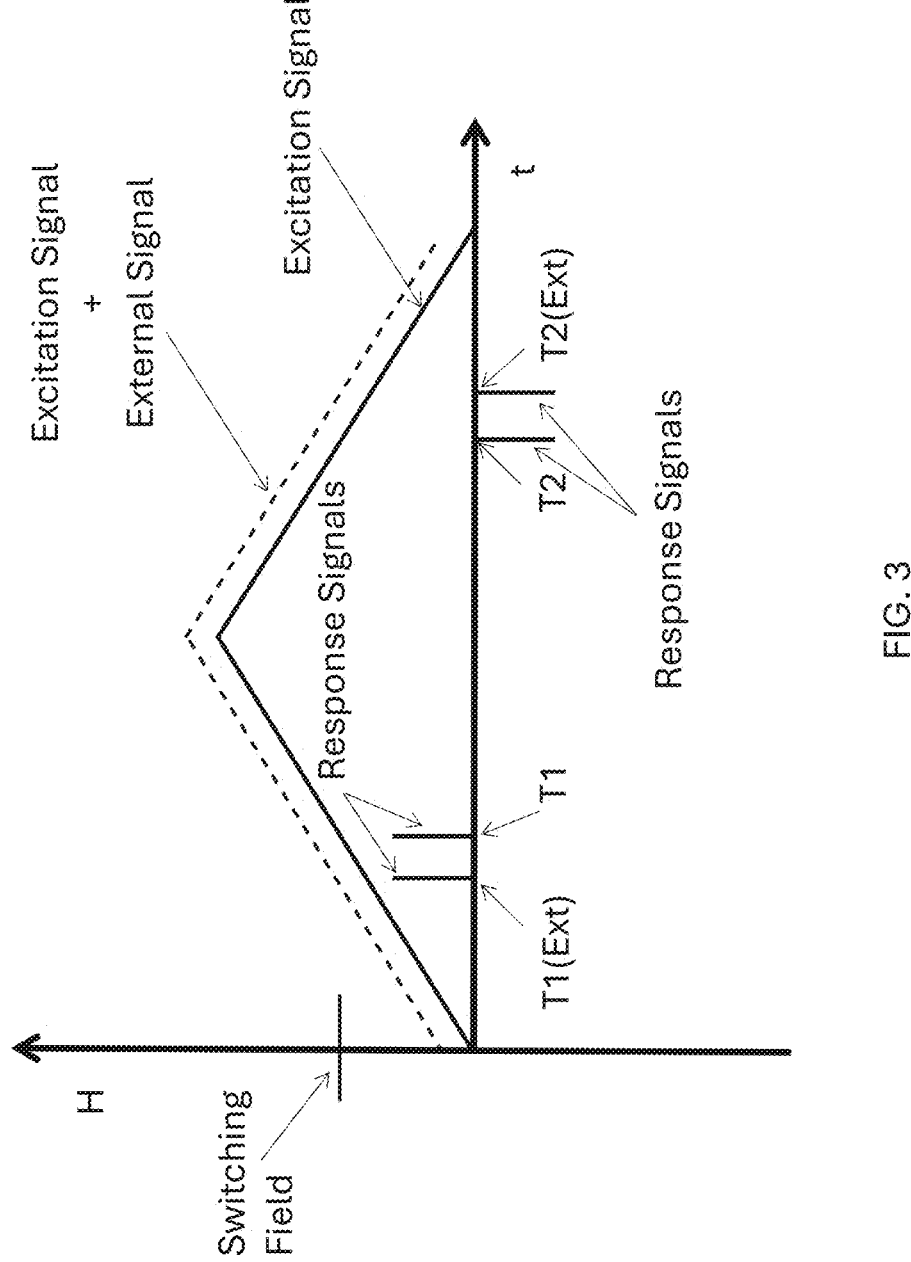
FIG. 3 is another exemplary plot of the excitation signal and the response signal from FIG. 2, further illustrating another response signal generated by the bistable microwire in response to the excitation signal amplified by an external signal.

Due to the magnetic properties of the microwire and monitoring both peaks, the identification tag is invariant to external magnetic field(s), as peaks behave antagonistic, and the sum of them remains unchanged. For instance, as illustrated in FIG. 3, when a microwire is present in an environment with an external signal, when an excitation signal is generated, the total magnitude of the magnetic field experienced by the microwire may increase. For example, the total experienced by the microwire is the excitation signal plus the external signal. As a result, the microwire will achieve the first peak at T1 (Ext), which is sooner than when the microwire would achieve the first peak in the absence of the external signal (i.e., T1). Nevertheless, the microwire will also achieve the second peak at T2 (Ext), which is later than when the microwire would achieve the second peak in the absence of the external signal (i.e., T1). Thus, although the individual peaks are at different times, the sum of the peaks remains generally the same (i.e., T=T1+T2=T1 (Ext)+T2 (Ext). The identification tag can be devalued only in the presence of magnetic fields that are weaker than the magnetic field produced by the excitation coil. In this case, the signal from the microwire will disappear. For most identification technologies based on magnetism this represents the crucial problem, where the magnetic ID tag becomes unusable. However, according to embodiments of the present invention, when the magnetic field is not present anymore, the signal from microwire will be back at the initial position.

For the identification tag according to embodiments of the present invention, at least one microwire with a minimum length of at least 6 mm may be necessary. In certain embodiments, the microwires may have diameters of from 10 to 100 μm and/or from 20 to 70 μm. Also, more microwires can be used, as it will create another unique signal, which can be assigned to the new ID tag.

Due to the properties and dimensions of the microwire, the ID tag can fit to any material, including the magnetic material, which is a disadvantage of many ID technologies based on magnetism.

The addition of the times Tx=Tx1+Tx2 results in an evaluation criterion that is physically robust and resistant to various interferences. Another important feature of the present invention involves the dynamic nature of the excitation, which significantly increases the number of available identification codes when using a given number of magnetically bistable elements. In one or more embodiments, the dynamic excitation change creates a 2D or 3D code that can be presented as a response map.

The present invention also relates to, with reference again to FIG. 1, the excitation and sensing system (e.g., a reader) for identifying an ID tag having at least one magnetically bistable element (e.g., bistable microwire 12), wherein the system comprises the excitation unit 14 and the pick-up or reading unit 16 that are equipped with appropriate antennas for propagating a magnetic field and receiving a bistable change response. The excitation and sensing system may further comprise a control unit 18 configured for, inter alia, (i) controlling the excitation unit 14 to generate the excitation signals, and (ii) analyzing the response signals generated by the bistable element and received by the pick-up unit 16. For example, the control unit 14 may be configured for analyzing the response signals from the bistable element and for determining and recording the times at which the bistable element changes state (e.g., T1 and T2), as well as determining the sum of such times which can be a representative identification code for the bistable element (i.e., T=T1+T2). In some embodiments, the excitation unit 14 may be connected to the control unit 18, such that the control unit 18 can control the excitation of the magnetic field generated by the excitation unit 14 in at least two stages or steps at different excitation parameters. The excitation parameters may include excitation frequency, excitation waveform, and/or excitation amplitude.

Code readers are known that use different excitation parameters, for example different frequencies, in order to verify the presence of ID tags tuned to different frequencies. It is common for RFID tags to be constructed to communicate in different frequency bands in different geographical areas. In international transport, ID tags with different frequency tuning may then be found side by side. In such a case, the corresponding ID tag communicates on its resonant frequency and the reader may successively try different frequencies, but the communication channel is substantially established on only one frequency according to the tuning of the ID tag. Such RFID tags, meanwhile, transmit a single identification code which does not change when the frequency changes. Thus, existing RF readers change their frequency only for the purpose of finding the correct communication frequency. In contrast to this setup, the present invention changes the excitation parameters, thereby resulting in the receiving of a new set of times Tx each time. By assigning such a set of times Tx to the corresponding excitation parameter, an identification code of the corresponding ID tag may be created. Such dynamic scanning results in a complex identification code can be written to the database of the control unit as a matrix, a set of assignments, and/or as an archive with indexing.

In a preferred arrangement, the excitation and sensing system may be arranged in relation to the ID tag so that the magnetically bistable elements are in an asymmetric magnetic field upon excitation, resulting in single jump changes. In some embodiments, the excitation and sensing system may be positioned within about 10 cm from the bistable elements.

To improve and speed up the algorithms for analyzing the received response signal, the ID tag may be provided with a single reference magnetically bistable element, preferably also in the form of the microwire, wherein the reference magnetically bistable element has previously known bistable change characteristics, in particular a previously known and repeatably accurate bistable change point at all excitation parameters. If the ID tag is known to contain a reference magnetically bistable element, the analysis can be simplified, for example, by the fact that once the peak corresponding to the reference magnetically bistable element is found, this can be used to determine the corresponding position within the timeline in the received response signal.

Embodiments of the present invention provide new possibilities for generating ID tag codes by forming combinations of different magnetically bistable elements in an ID tag and scanning their response, evaluated by the sum Tx=Tx1+Tx2, for each ID tag at different excitation parameters, in particular at different frequencies of the excitation magnetic field. The recorded response is stored in memory of the control unit as a unique identification code for the corresponding ID tag. Since even small deviations in the storage and in the material composition of the individual magnetically bistable elements within a single ID tag result in different responses, a large set of available unique identification codes may be generated. The parameters of the excitation field are variable over a wide range, for example, the excitation frequency can vary up to 1:103. Compared to RFID technology, a significant advantage is the low cost of the ID tag, which does not need to have an antenna or a chip as a carrier for the discreetly assigned identification code. Magnetically bistable wires have dimensions that are significantly smaller than RFID tags, which increases the range of application possibilities. With just a slight change in the diameter or composition of microwires according to embodiments of the present invention, we can create totally a new and specific signal from the microwire representing the ID tag.

The control unit 18 of the ID tag system 10 may, as illustrated in FIG. 1, comprise a computing device. For instance, the computing device may include a processing element 20, a memory element 22, and circuitry capable of wired and/or wireless communication with the excitation unit 14 and/or the pick-up unit 16, including, for example, a transceiver or communication element 24.

The processing element 20 may include electronic hardware components such as processors. The processing element 20 may include digital processing unit(s). The processing element 20 may include one or more microprocessors (single-core and multi-core), microcontrollers, digital signal processors (DSPs), field-programmable gate arrays (FPGAs), analog, or digital application-specific integrated circuits (ASICs), or the like, or combinations thereof, without limitation. The processing element 20 may generally execute, process, or run instructions, code, code segments, software, firmware, programs, applications, apps, processes, services, daemons, or the like. For instance, the processing element 20 may execute a software application/program configured with instructions for performing and/or enabling performance of at least some of the methods and/or process steps described herein. In various examples, the software program may comprise instructions respectively stored on computer-readable media of a memory element 22, which is described in more detail below. The processing element 20 may also include hardware components such as finite-state machines, sequential and combinational logic, and other electronic circuits that can perform the functions necessary for the operation of various examples of the present disclosure. The processing element 20 may be in communication with the other electronic components through serial or parallel links that include universal busses, address busses, data busses, control lines, and the like.

The memory element 22 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 22 may be embedded in, or packaged in the same package as, the processing element 20. The memory element 22 may include, or may constitute, a "computer-readable medium." The memory elements 22 may store the instructions, computer code, code segments, software, firmware, programs, applications, apps, services, daemons, or the like that are executed by the processing element 20. In an embodiment, the memory element 22 respectively store the software applications/program. The memory element 22 may also store settings, data, documents, databases, and the like. For example, the memory element 22 may provide the database on which the identification codes described herein can be stored and utilized.

The communication element 24 generally allows communication between the control unit 18 and the excitation unit 14 and/or the pick-up unit 16, as well as perhaps external devices, over one or more communication networks. The communication element 24 may include one or more signal or data transmitting and receiving circuits, such as antennas, amplifiers, filters, mixers, oscillators, Ethernet interfaces, digital signal processors (DSPs), and the like. The communication element 24 may establish communication wirelessly by utilizing radio frequency (RF) signals and data that complies with communication standards such as cellular 2G, 3G, 4G or 5G, Institute of Electrical and Electronics Engineers (IEEE) 802.11 standard such as WiFi, IEEE 802.16 standard such as WiMAX, Bluetooth™, or combinations thereof. In addition, the communication element 24 may utilize communication standards such as ANT, ANT+, Bluetooth™ low energy (BLE), the industrial, scientific, and medical (ISM) band at 2.4 gigahertz (GHz), or the like. The communication element 24 may establish communication through connectors or couplers that receive metal conductor wires or cables, like Cat 6 or coax cable, which are compatible with networking technologies such as Ethernet. In various examples, the communication element 24 may also couple with optical fiber cables, Ethernet interfaces, or SPI interfaces, without limitation. The communication element 24 may be in communication with the processing element 20 and the memory element 22.

The communication network over which the communication element 24 operates may include the Internet, Ethernet networks, cellular communication networks, local area networks, metro area networks, wide area networks, cloud networks, plain old telephone service (POTS) networks, and the like, or combinations thereof. The communication network may be wired, wireless, or combinations thereof and may include components such as modems, gateways, switches, routers, hubs, access points, repeaters, towers, and the like. The client control unit 18 may, for example, connect to the communication network either through wires, such as electrical cables or fiber optic cables, or wirelessly, such as RF communication using wireless standards such as cellular 2G, 3G, 4G or 5G, Institute of Electrical and Electronics Engineers (IEEE) 802.11 standards such as WiFi, IEEE 802.16 standards such as WiMAX, Bluetooth™, or combinations thereof.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

Claims Not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method for identifying an identification (ID) tag that includes at least one magnetically bistable element, wherein the method comprises the following steps:
  (a) transmitting, via an excitation antenna, an excitation signal to the magnetically bistable element, wherein the excitation signal comprises a triangular wave;
  (b) receiving, via a pick-up antenna, a response signal generated by the bistable element;
  (c) analyzing the response signal to identify at least two peaks in the response signal; and
  (d) generating an identification code based on the two peaks, wherein the identification code is representative of an identity of the bistable element.

2. The method of claim 1, wherein said analyzing of step (c) or said generating of step (d) includes determining a first time T1 at which a first peak of the at least two peaks in the response signal occurs and a second time T2 at which a second peak of the at least two peaks in the response signal occurs, and wherein the identification code is a sum of the first time T1 and the second time T2.

3. The method of claim 1, wherein said analyzing of step (c) and said generating of step (d) are performed by a computing device comprising a processing element and a memory element, wherein the memory element provides a database, and wherein the computing device is configured to compare the identification code generated in step (d) with a plurality of identification codes stored in the database to identify the bistable element of the ID tag.

4. The method of claim 1, wherein the excitation antenna and the pick-up antenna each comprises an inductor coil.

5. The method of claim 1, wherein the identification code is a first code, wherein said steps (a) through (d) are repeated after adjusting an excitation parameter of the excitation signal to generate a second identification code.

6. The method of claim 5, wherein excitation parameter is selected from one or more of the following: a frequency of the excitation signal, a waveform of the excitation signal, and an amplitude of the excitation signal.

7. The method of claim 1, wherein the bistable element comprises a bistable microwire comprising a metal core and a glass coating around the metal core.

8. The method of claim 7, wherein the bistable microwire has a length of at least 6 mm.

9. The method of claim 7, wherein the bistable microwire has a diameter from 10 to 100 μm.

10. The method of claim 1, wherein said transmitting of step (a) and said receiving of step (b) are performed with the excitation antenna and the pick-up antenna being positioned within 10 cm of the bistable element.

11. An identification system comprising:
  an excitation antenna configured to transmit an excitation signal to at least one magnetically bistable element, wherein the excitation signal comprises a triangular wave;
  a pick-up antenna configured to receive a response signal generated by the bistable element; and
  a computing device comprising a processing element and a memory element, and wherein the processing element is configured to perform the following steps—
    analyze the response signal to identify at least two peaks in the response signal; and
    generate an identification code based on the two peaks, wherein the identification code is representative of an identity of the bistable element.

12. The system of claim 11, wherein during said analyzing and/or said generating steps, the processing element is configured to determine a first time T1 at which a first peak of the at least two peaks in the response signal occurs and a second time T2 at which a second peak of the at least two peaks in the response signal occurs, and wherein the identification code is a sum of the first time T1 and the second time T2.

13. The system of claim 11, wherein the memory element of the computing device provides a database, and wherein the processing element is further configured to compare the generated identification code to a plurality of identification codes stored in the database to identify the bistable element.

14. The system of claim 11, wherein the excitation antenna and the pick-up antenna each comprises an inductor coil.

15. The system of claim 11, wherein the identification code is a first code, wherein the processing element of the computing device is configured to repeat the analyzing and generating steps upon an excitation parameter of the excitation signal being adjusted, to thereby generate a second identification code.

16. The system of claim 15, wherein excitation parameter is selected from one or more of the following: a frequency of the excitation signal, a waveform of the excitation signal, and an amplitude of the excitation signal.

17. The system of claim 11, wherein the bistable element comprises a bistable microwire comprising a metal with a glass coating, wherein the bistable microwire has a length of at least 6 mm, and wherein the bistable microwire has a diameter from 10 to 100 μm.

18. The system of claim 11, wherein the excitation antenna and the pick-up antenna are configured to transmit to and receive from, respectively, the bistable element when the excitation antenna and the pick-up antenna are positioned within 10 cm of the bistable element.

* * * * *